July 18, 1933.   R. L. GRUSS   1,918,698
SHOCK ABSORBING STRUT FOR AEROPLANES
Filed Sept. 9, 1929
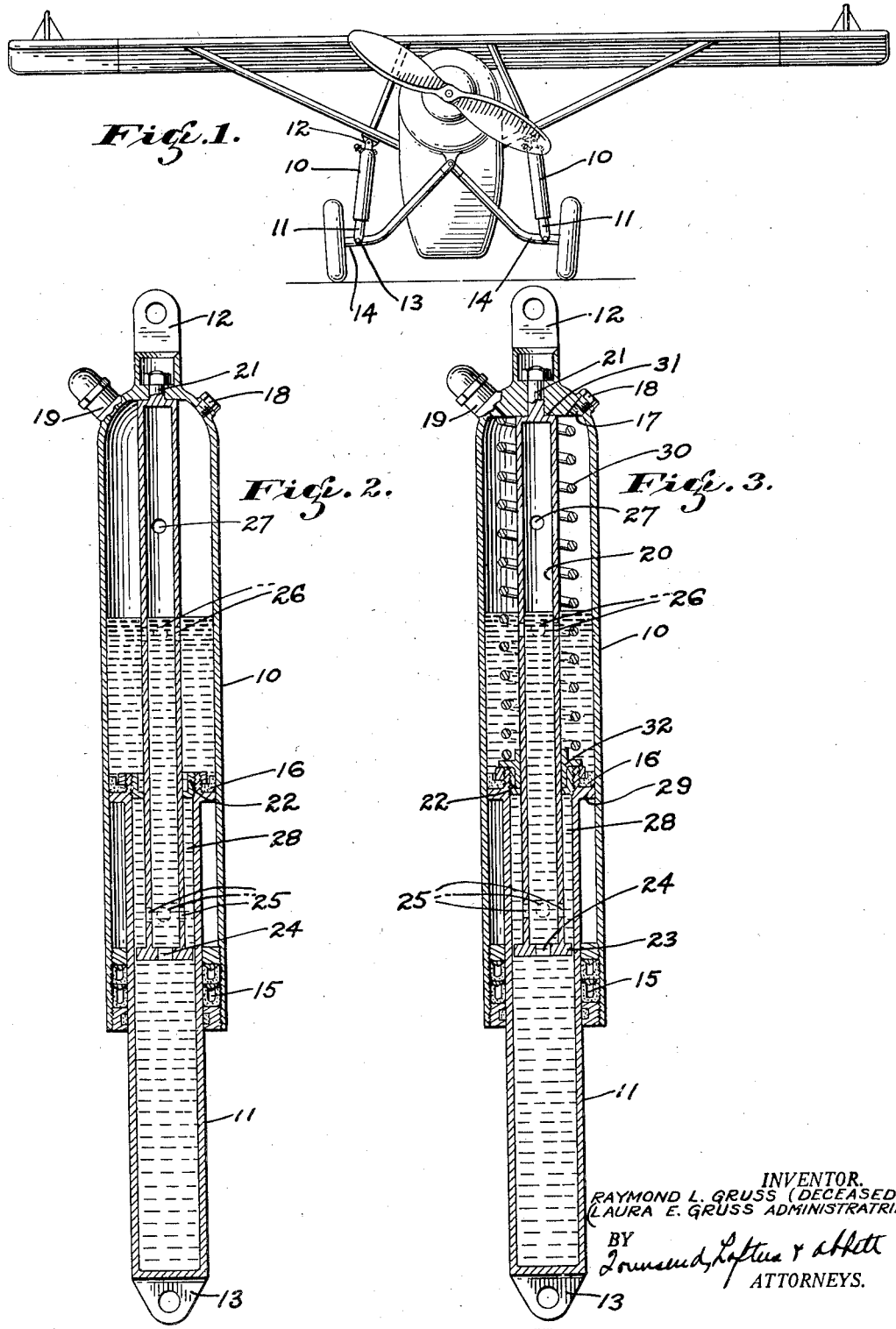
INVENTOR.
RAYMOND L. GRUSS (DECEASED)
(LAURA E. GRUSS ADMINISTRATRIX).
BY
ATTORNEYS.

Patented July 18, 1933

1,918,698

UNITED STATES PATENT OFFICE

RAYMOND L. GRUSS, DECEASED, LATE OF SAN FRANCISCO, CALIFORNIA, BY LAURA E. GRUSS, ADMINISTRATRIX, OF SAN FRANCISCO, CALIFORNIA, ASSIGNOR, BY MESNE ASSIGNMENTS, TO THE CLEVELAND PNEUMATIC TOOL COMPANY, OF CLEVELAND, OHIO, A CORPORATION OF OHIO

SHOCK ABSORBING STRUT FOR AEROPLANES

Application filed September 9, 1929. Serial No. 391,429.

This invention resides in the provision of a simply constructed, light, strong and durable shock absorbing device which may be readily incorporated with the running gear of an aeroplane and made to serve as a shock absorbing strut that will strengthen the running gear as well as positively and effectively check the shocks, jars and rebound actions which are occasioned in "taking off" and in landing aeroplanes.

An object of the invention is to provide a shock absorbing strut of the character described which employs a compressible cushioning medium and a non-compressible fluid in a novel and effective manner, together with such a construction and an arrangement of parts that the required cushioning action will be provided over a longer range of movement of the parts of the shock absorbing device than is required with similar devices when applied to land vehicles.

A further object is to provide in a device of the character described a novel means for causing a reliable checking of the shock and rebound actions, which means includes telescoped cylinders; a plunger carried by one cylinder with its especially constructed head working in the other cylinder, together with two mediums of control of the movements of these parts, one of which mediums will be a compressible yielding one to check and absorb violent shocks and jars, whereas the other medium will be a non-compressible fluid and will hydraulically control the rebound action without detracting from the effectiveness of the shock cushioning medium.

A further object is to provide a cushioning device of the character described in which a double checking action is provided on the rebound and shock absorbing movement of the parts thereof without employment of movable valve parts or any parts or elements not formed integral with the plunger and cylinders excepting, of course, the packing elements, thereby making for simplicity, inexpensiveness as to construction, and lightness as to weight.

A further improvement resides in the fact that the shock absorbing device of this invention is constructed so that it may be readily adapted for employment of compressed air or a spring, or both, as cushioning and shock absorbing mediums, there being little or no change required in the construction to use the air in place of the spring, or vice versa.

With the above mentioned and other objects in view, the invention consists in the novel construction and combination of parts hereinafter described, illustrated in the accompanying drawing, and set forth in the claims hereto appended, it being understood that various changes in the form, proportion, size and minor details of construction within the scope of the claims may be resorted to without departing from the spirit or sacrificing any of the advantages of the invention.

In the drawing—

Fig. 1 is a front elevation of an aeroplane of the monoplane type equipped with the improved strut, Fig. 2 is a sectional view in elevation, showing the details and interior construction of the improved strut, and Fig. 3 shows a modified form of the strut illustrated in Fig. 2.

In the present embodiment of the invention as illustrated in detail in the accompanying drawing, there is shown in Fig. 1 an upper cylinder 10 in which a lower cylinder 11 is telescoped, there being means 12 on the upper end of the cylinder 10 providing for attachment of said cylinder to an aeroplane fuselage, as indicated in Fig. 1, and a similar means 13 on the lower cylinder 11 for attaching said cylinder to the axle 14 or some other suitable part of the running of the aeroplane.

Suitable packing means 15 is mounted in the lower end of the cylinder 10. A similar packing means 16 is mounted on the upper end of the lower cylinder 11 and works against the inner walls of the cylinder 10. An oil filling opening 17 normally closed by a movable plug 18, is provided in the upper end of the cylinder 10, whereby the device may be charged with oil, for example, up to the level indicated in Figs. 2 and 3 of the drawing. A compressed air intake valve 19 is also provided in the upper end of the cylinder 10, whereby the device may be charged with air, for example, up to about one hundred pounds pressure.

A tubular rod 20 is secured by fastening means 21 to the upper closed end of the cylinder 10 so that it is centrally disposed with relation to the cylinder 10 and extends downwardly and centrally into the lower cylinder 11. A bearing member 22 is mounted in the upper end of the cylinder 11, and the tubular rod 20 has a working fit in said bearing. On the lower end of the tubular rod 20 there is an annular, laterally extended head member 23, the outer periphery of which is slightly spaced from the inner wall of the cylinder 11. A central opening 24 in said annular head 23 facilitates the hydraulic control action as will be later more fully described. At the lower end of the tubular rods 20, but close to the head member 23, there are a plurality of ports 25. Similar openings or ports 26 are also provided in said tubular rod 20 at a point approximately midway of its upper and lower ends and just below the normal oil level. Another opening 27 is provided in said tubular member and communicates with the air chamber portion of the cylinder 10. It will be noted that the tubular rod 20 is of considerably less diameter than the cylinder 11, whereby there will be defined between the head 23 and bearing member 22, an annular space or recoil chamber 28. It will also be noted that the packing means 16 is supported upon an annular projection 29 carried by the cylinder 11 and this packing arrangement, together with bearing member 22, provides a piston head on the upper end of the cylinder 11.

In Fig. 2, there is shown a modified arrangement in which a coiled expansion spring 30 is employed to serve as a cushioning medium, this spring being arranged so as to surround the tubular member 20 with its upper end engaged against the upper end of the cylinder 10 and its lower end against the upper end of the cylinder 11. Suitable modifications and fittings 31 and 32, respectively, may be employed as bearings for the ends of this spring. This spring may be employed to the exclusion of compressed air as a cushioning medium or it may be used together with the compressed air. In some instances the spring and air combined may be desirable and in either event, this modified device will operate in substantially the same manner as the form of device shown in Fig. 1. When the spring, without the compressed air, is used there is still provided in the cylinder 10 a column of air at atmospheric pressure. In this form of the invention the hydraulic medium, the oil, is employed in the same manner as in the other form of the invention.

Operation

When the weight of the plane is on the ground, the upper end of the cylinder 11 is at a point about half way between the limits of its movement. Therefore, when in this position and while taxiing the plane, the air pressure within the device is comparatively low and in direct proportion to the weight sustained. The air cushion is therefore susceptible to the greatest amount of flexibility under that weight and, as a result, relieves the plane of, and is protected against all jar and racking when taxiing over rough ground.

In "taking off", as the plane tends to rise, the struts extend, allowing the compressed air in the cylinder 10 to expand to the proportion of weight sustained, until the plane is clear of the ground, at which time the strut will be fully extended. When landing, on the first impact of the wheels, the shock is absorbed by the full length of the air cushion, starting with low pressure and gradually increasing as the strut is deflected, thereby checking the downward motion of the plane in direct proportion to the force at which the landing is made.

In the shock absorbing operation, the tubular rod 20 travels downward in the cylinder 11, the head 23 moving against the body of oil and thereby aiding in checking the landing shock. At the same time, the columns of oil move upward against the cushion of air and compress said air to thereby also relieve the shock. The upper end of the cylinder 11 having the piston-like head pushes upward the annular column of oil. The oil contained in the tubular member 20 is also pushed upward against the air column contained in the upper end of said tubular member. In this way there are provided two separate columns of oil being operated against two air cushions, thus making a more effective cushioning and shock absorbing operation. The annular space 28 acts as a recoil chamber and when the cylinders tend to move apart as on their recoil action, this oil is trapped in said chamber and discharges therefrom slowly through the openings 25 and between the annular member 23 and the cylinder 11. This provides an effective hydraulic control of the rebound action at the same time an additional checking of the recoil action is provided by the fact that the discharge of oil under air pressure from the tubular member 20 is considerably obstructed by the restricted open end of said member at 24. By this arrangement of the device, the full efficiency is obtained from the air cushion and likewise the oil is utilized hydraulically and pneumatically to its fullest efficiency to assist in a gradual check when landing and to serve as a positive rebound check.

While there is shown the preferred form of the invention as now known, it is to be understood that various changes may be made in its construction without departing from the spirit of the invention as defined in the appended claims.

Having thus described the invention, what is claimed and desired to be secured by Letters Patent is—

1. A shock absorbing strut for aeroplanes comprising a downwardly projecting open ended cylinder adapted to be attached to the aeroplane structure, an upwardly projecting cylinder with a piston at its upper end slidable within said first cylinder and adapted to be attached to the running gear of the aeroplane, a second downwardly projecting cylinder attached to said first cylinder and arranged concentrically within said first cylinder extending through an opening in said piston and having an end flange slidable within said upwardly projecting cylinder, said second downwardly projecting cylinder having a restricted opening in its lower end and ports arranged intermediate its ends connecting the interior of said second cylinder with the two other cylinders, and packings carried by said first and said second cylinders for confining a compressible and a non-compressible fluid within said cylinders whereby said compressible fluid will function to absorb shocks imposed upon said strut and said non-compressible fluid will act to check rebound.

2. A shock absorber comprising two upright cylinders, one of which is slidable within the other and both of which provide a closed chamber for oil and air, a tubular plunger rod fixed to the uppermost cylinder and extending into the other cylinder, a member closing the upper part of said lower cylinder and through which the rod slidably extends, and a plunger head on the lower part of said rod defining an annular recoil chamber between it and said member, said tubular rod having openings at spaced points therein, which openings communicate the bore of said tubular rod with the lower cylinder beyond said tubular rod, with the recoil chamber and with the oil and air containing portions of the upper cylinder.

3. A shock absorber comprising two upright cylinders, one of which is slidable within the other and both of which provide a closed chamber for oil and air, a tubular plunger rod fixed to the uppermost cylinder and extending into the other cylinder, a member closing the upper part of said lower cylinder and through which the rod slidably extends, and a plunger head on the lower part of said rod defining an annular recoil chamber between it and said member, said tubular rod having openings at spaced points therein, which openings communicate the bore of said tubular rod with the lower cylinder beyond said tubular rod, with the recoil chamber and with the oil and air containing portions of the upper cylinder, said plunger head having its periphery slightly spaced from the lower cylinder to provide a small passageway for oil past the head.

4. A shock absorber comprising two upright cylinders, one of which is slidable within the other and both of which provide a closed chamber for oil and air, a tubular plunger rod fixed to the uppermost cylinder and extending into the other cylinder, a member closing the upper part of said lower cylinder and through which the rod slidably extends, and a plunger head on the lower part of said rod defining an annular recoil chamber between it and said member, said tubular rod having openings at spaced points therein, which openings communicate the bore of said tubular rod with that part of the lower cylinder below the recoil chamber, with the recoil chamber and with the oil and air containing portions of the upper cylinder, one of said openings being at the lower end of the tubular rod and of less diameter than the bore of the rod.

5. A shock absorber comprising upright telescoped, relatively slidable cylinders, both of which provide an enclosed chamber for compressible and non-compressible mediums, a tubular plunger rod fixed to the uppermost cylinder and extending into the other cylinder, a member closing the upper portion of the lowermost cylinder, through which member the plunger rod slidably extends, a plunger head carried on the lower end of said rod and working in the lowermost cylinder, which head is provided with a central opening communicating with the bore of said rod, said head and closing member, and the lower cylinder and tubular rod, defining an annular recoil chamber, said tubular rod having openings therethrough communicating the interior thereof with the recoil chamber and also having additional openings therein communicating the interior thereof with the upper part of the upper cylinder and with the lower part of the upper cylinder.

6. A shock absorber comprising a downwardly extending open ended cylinder, an upwardly extending open ended cylinder telescoping into the downwardly extending cylinder, packing means between the telescoped ends of said cylinders and forming a seal between their side walls whereby a compartment for a compressible fluid will occur above said packings, an incompressible fluid filling the upwardly extending cylinder and partially filling the downwardly extending cylinder for a distance above the packing carried by the upwardly extending cylinder, a tubular rod secured within the downwardly extending cylinder and telescoping into the upwardly extending cylinder, a head on said tubular rod slidable in said upwardly extending cylinder and an inwardly extending ring on said upwardly extending cylinder slidable on said tubular rod, means forming a restricted opening from the tubular rod into the upwardly extending cylinder, whereby a restricted flow of incompressible fluid may occur as the cylinders telescope with relation to each other, an incompressible fluid compartment occurring between said head and ring and the upwardly extending cylinder and by-pass openings through the side walls of the tubular rod permitting the incompressible fluid from said last named compartment to flow into the tubular rod as the cylinders telescope outwardly.

7. A shock absorber comprising a downwardly extending open ended cylinder, an upwardly extending open ended cylinder telescoping into the downwardly extending cylinder, packing means between the telescoped ends of said cylinders and forming a seal between their side walls whereby a compartment for a compressible fluid will occur above said packings, an incompressible fluid filling the upwardly extending cylinder and partially filling the downwardly extending cylinder for a distance above the packing carried by the upwardly extending cylinder, a tubular rod secured within and spaced from said downwardly extending cylinder and telescoping into the upwardly extending cylinder, a head on said tubular rod slidable in said upwardly extending cylinder and an inwardly extending ring on said upwardly extending cylinder slidable on said tubular rod, means forming a restricted opening from said tubular rod into the upwardly extending cylinder, whereby a restricted flow of incompressible fluid may occur as the cylinders telescope with relation to each other, an incompressible fluid compartment occurring between said head and ring, said tubular rod having a by-pass opening therethrough connecting said compartment with the bore of said tubular rod and said tubular rod having two vertically spaced openings above the normal position of said ring, the uppermost of said openings being located at approximately the limit of upward travel of the ring, whereby incompressible fluid within the tubular rod may be discharged into the compressible fluid space after the ring has passed above the lower of said two spaced openings.

LAURA E. GRUSS,
*Administratrix of the Estate of Raymond L. Gruss, Deceased.*